June 3, 1924.

S. KUCHARSKI

OPTICAL RECTIFIER

Filed Sept. 7, 1921

INVENTOR
Stanislaus Kucharski
BY ATTORNEY

June 3, 1924.

S. KUCHARSKI

OPTICAL RECTIFIER

Filed Sept. 7, 1921

INVENTOR
Stanislaus Kucharski
BY ATTORNEY
Pennie Davis Marvin & Edmonds

June 3, 1924.

S. KUCHARSKI

OPTICAL RECTIFIER

Filed Sept. 7, 1921

INVENTOR
Stanislaus Kucharski
BY ATTORNEY
Pennie Davis Marvin & Edmonds

Patented June 3, 1924.

1,496,343

UNITED STATES PATENT OFFICE.

STANISLAUS KUCHARSKI, OF CHARLOTTENBURG, NEAR BERLIN, GERMANY.

OPTICAL RECTIFIER.

Application filed September 7, 1921. Serial No. 499,071.

*To all whom it may concern:*

Be it known that I, STANISLAUS KUCHARSKI, a citizen of Germany, and whose post-office address is Charlottenburg, near Berlin, Dernburgstrasse 45, Germany, have invented certain new and useful Improvements in Optical Rectifiers, of which the following is a specification.

The invention relates to cinematograph projection apparatus of that kind in which the displacement of the picture is equalized by optical means, especially to those in which a mirror or prism movable on an axis is employed. From the theoretical point of view all parts of such apparatus may be accurately determined as regards their shape and dimensions, so that a correct assemblage should at any rate yield the exact result. But in practice it has been found that such accuracy of the parts, especially of the optical parts (such as objective, prism, mirror and the like) cannot be obtained. The apparatus therefore, must be constructed in such a way, that any inaccuracies of the parts may be made up for by means of suitable adjusting devices.

According to the invention provision is made, that the position of the equalizing member can be changed in respect of the parts actuating such members, without interfering with the position of the optical axis.

In the drawings—

Figure 1:
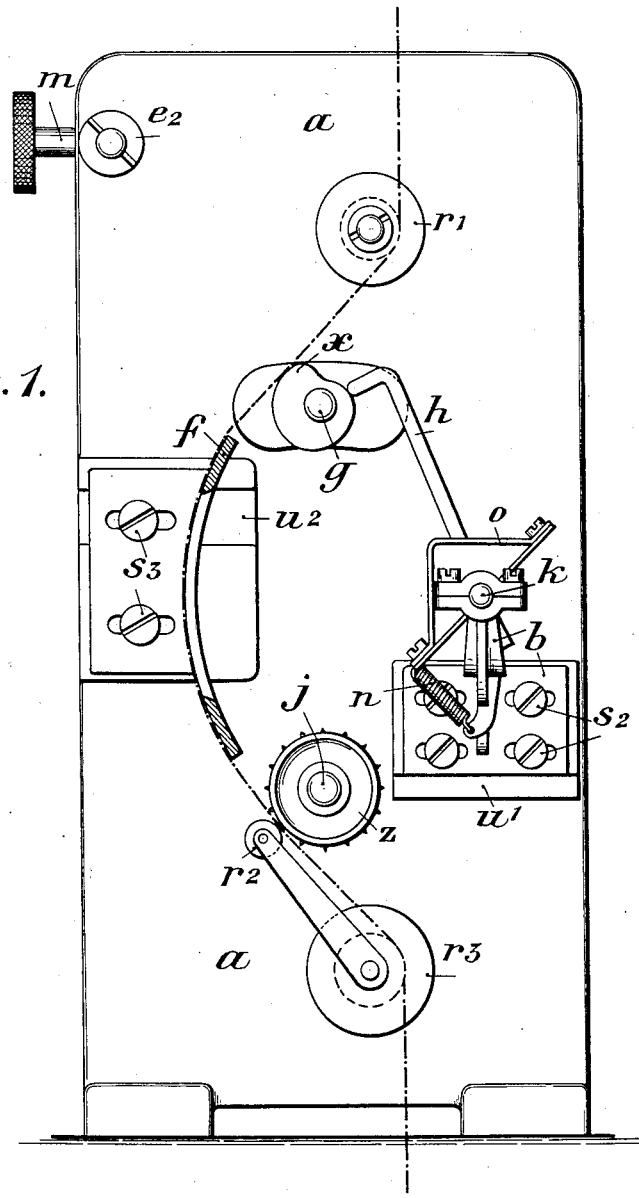
Fig. 1 is a front view of one form of execution.
Figure 2:
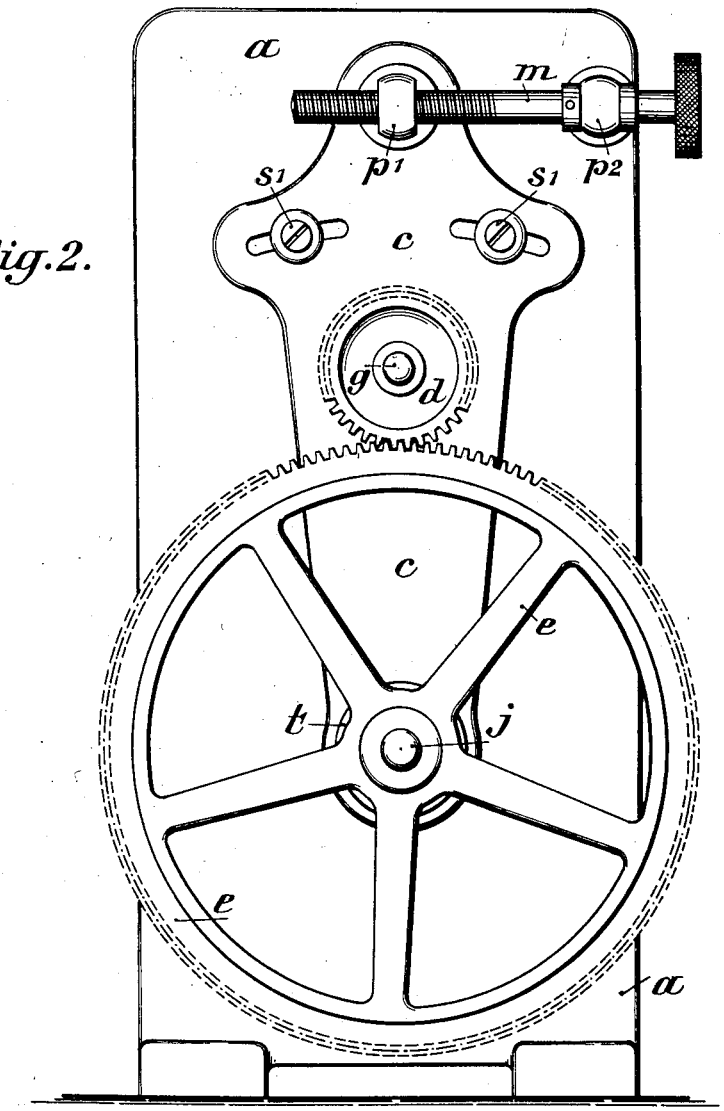
Fig. 2 is a rear view.
Figure 3:
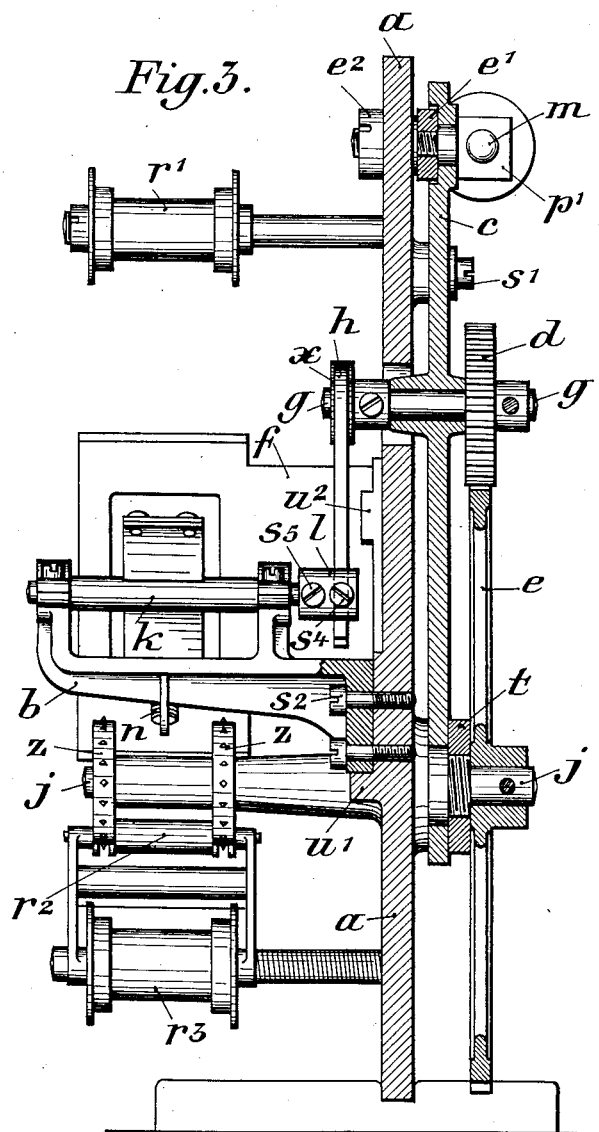

Fig. 3 a vertical cross-section.

$a$ is the frame of the apparatus, $b$ a bearing support, carrying the axle $k$, upon which latter an objective $o$ containing the mirror prism is arranged. The window $f$ of the apparatus is secured by means of two screws $s^3$ to the frame $a$. In a nave pertaining to the frame $a$ the axle $j$ is journaled, carrying on its front end the shifting roller $z$ and on its rear end the toothed wheel $e$ belonging to the gearing. Concentrically to said axle the swing or swinging plate $c$ is disposed, which is safely guided by means of the ring $t$ and the screws $s^1$. The axle $g$ is carried through a nave of the swing $c$, said axle being provided at its forward end with a cam $x$ and at its rear end with a small toothed wheel $d$ engaging the toothed wheel $e$. The swing $c$ is held in position by means of the adjusting screw $m$ which is screwing into the bearing $p^1$ of ely turnabl. and which is bearing in a likewise freely turnable bearing $p^2$ arranged on the frame $a$. The lever $h$ rests against the cam $x$ and is connected with the axle $k$ by means of the journal box $l$; consequently, provided the cam $x$ is properly calculated the prism of the objective will describe such a movement, that the displacement of the picture is equalized.

The film-band is guided over the roller $r^1$, the window $f$, the shifting roller $z$ and the rollers $r^2$ and $r^3$. The rails $u^1$ and $u^2$ pertaining to the frame $a$ permit the bearing support $b$ on the one hand and the window $f$ on the other hand to move exactly straight and parallel to the axis of the apparatus. The spring $n$ is exerting a pulling force upon the angle objective $o$ in such a manner, that the lever $h$ always rests against the cam $x$.

Owing to the capability of adjusting the support $b$ by loosening the screws $s^2$ there is derived besides the adjustment of the focus the further advantage, that the distance of the axles $g$ and $k$ from each other and in consequence the relative effect of the cam $x$ upon the objective can be correspondingly increased or decreased. By loosening the screw $s^4$ (Fig. 3) the lever $h$ may be extended or shortened, so that its upper end is brought into the proper position with respect to the center of the spindle $g$. By loosening the screw $s^5$ the prism of the objective may be adjusted in relation to the lever $h$ and thus the height of the picture on the screen may be readjusted, the exact adjustment in this respect however is effected through turning the screw $m$. By adjusting the swing $c$ by means of the screw $m$ the position of angle of the prism of the objective can be accurately adjusted, in that the cam $x$ is thereby adjusted correspondingly. After the whole system has been accurately adjusted by means of these adjustment agents, the proper focus of the objective may be accurately effected once more with the aid of adjustment of the window $f$ by loosening of the screw $s^3$.

In the claims the term "reflector" is intended to cover a mirror, totally reflecting prism or other optical instrument which causes an incident light ray to be reflected without distortion.

I claim:

1. An optical rectifier, for a cinematograph comprising, in combination with a window and film moving means, an oscillating reflector, driven by a cam and adjustable lever and means for adjusting the window with respect to the reflector and means for moving the axis of the cam with respect to the lever, said moving and adjusting means being arranged so as not to disturb the optical axis of the apparatus.

2. Optical rectifier for a cinematograph comprising, in combination with a window and film moving means, a single oscillating reflector driven by a cam and adjustable lever, means for adjusting the window with respect to the reflector, means for moving the cam axis with respect to the lever and reflector axis, said adjusting and moving means being arranged so as not to disturb the optical axis of the apparatus.

3. An apparatus according to claim 2 in which the cam axle is journalled in a swinging plate.

4. An optical rectifier for a cinematograph comprising, in combination with a window and film moving means, a single oscillating reflector driven by a cam and adjustable lever, a cam axle, journalled in a swinging plate, which plate is pivoted on an axle parallel to the cam axle and directly connected with the moving film, means for transmitting motion from the pivot axle to the cam axle and means for swinging the plate on its pivot whereby the cam axle is displaced with respect to the lever and the reflector axis.

5. An apparatus according to claim 4 in which a gear mounted on the pivot axle meshes with a gear mounted on the cam axle.

In testimony whereof I have affixed my signature in presence of two witnesses.

STANISLAUS KUCHARSKI.

Witnesses:
ALWIN HANSCINANN,
GUSTAV PICKOK.